United States Patent [19]
Schmitt

[11] Patent Number: 5,076,777
[45] Date of Patent: Dec. 31, 1991

[54] APPARATUS FOR COEXTRUDING PLASTICS MATERIALS

[75] Inventor: William T. Schmitt, Cincinnati, Ohio

[73] Assignee: Cincinnati Milacron Inc., Cincinnati, Ohio

[21] Appl. No.: 631,235

[22] Filed: Dec. 20, 1990

[51] Int. Cl.⁵ .............................................. B29C 47/56
[52] U.S. Cl. .................... 425/133.5; 264/39; 425/188
[58] Field of Search ............... 264/39; 425/130, 131.1, 425/133.1, 133.5, 185, 186, 188, 190, 192 R, 225, 462, 557, 559

[56] References Cited

U.S. PATENT DOCUMENTS

| | | | |
|---|---|---|---|
| 3,162,900 | 12/1964 | Huelskamp | 264/39 |
| 3,481,001 | 12/1969 | Stillhard | 425/205 |
| 3,751,203 | 8/1973 | Hehl | 425/190 |
| 3,780,154 | 12/1973 | Muller et al. | 264/176.1 |
| 3,836,301 | 9/1974 | Hehl | 425/192 |
| 3,909,173 | 9/1975 | Latter | 425/192 |
| 4,005,961 | 2/1977 | Manceau | 425/190 |
| 4,243,362 | 1/1981 | Rees et al. | 425/130 |
| 4,280,801 | 7/1981 | Wheeler, Jr. et al. | 435/113 |
| 4,334,847 | 6/1982 | Schauffele | 264/39 |
| 4,358,261 | 11/1982 | Ohki | 424/131 |
| 4,405,547 | 9/1983 | Koch et al. | 264/171 |
| 4,435,141 | 3/1984 | Weisner et al. | 425/131 |
| 4,443,397 | 4/1984 | Hahn et al. | 264/171 |
| 4,472,126 | 9/1984 | Mitsui et al. | 425/114 |
| 4,643,659 | 2/1987 | Paul | 425/131.1 |

FOREIGN PATENT DOCUMENTS

| | | | |
|---|---|---|---|
| 0213370 | 9/1984 | Fed. Rep. of Germany | 425/190 |
| 0213388 | 9/1984 | Fed. Rep. of Germany | 425/190 |

Primary Examiner—Jay H. Woo
Assistant Examiner—William J. Matney, Jr.
Attorney, Agent, or Firm—Nies, Kurz, Bergert & Tamburro

[57] ABSTRACT

Apparatus for coextrusion of two plastics materials provided by respective first and second extruders. The first extruder is oriented in a substantially horizontal direction, and the second extruder is positioned above the first extruder and is pivotally movable about a horizontal axis. A electrically powered jackscrew is provided for pivoting the second extruder about the pivot axis for orientation of the outlet of the second extruder with an inlet for an extrusion die. The second extruder is mounted on a carriage that is slidably carried by a support frame so that the second extruder can be moved along its own axis and toward and away from the axis of the first extruder.

11 Claims, 5 Drawing Sheets

APPARATUS FOR COEXTRUDING PLASTICS MATERIALS

BACKGROUND OF THE INVENTION

1. Field of the Invention

The present invention relates to extrusion apparatus for softening plastics materials so that they can be extruded through an extrusion die to provide an extruded shape of predetermined cross-sectional configuration. More particularly, the present invention relates to extrusion apparatus in which a pair of individual extruders is provided, each extruder feeding material into a single extrusion die for coextrusion of plastics materials from two separate sources, wherein one of the extruders is supported above the other, to feed a common extrusion die, and the longitudinal axes of the respective extruders are disposed at an acute angle relative to each other.

2. Description of the Related Art

The coextrusion of materials from plural extruders is known. For example, in U.S. Pat. No. 3,780,154, which issued Dec. 18, 1973, to Karl Heinz Müller et al., there is disclosed a pair of extruders for feeding a single extrusion die and for extruding a cylinder from a first material and simultaneously extruding over and surrounding the cylinder an outer sleeve from a different material. The extruders are so oriented that the center cylindrical portion of the extruded article is formed from material that issues from a horizontally arranged extruder, while the surrounding sleeve material is provided by a second extruder that is positioned so that its longitudinal axis intersects and forms an obtuse angle with the longitudinal axis of the first extruder. The relative positions of the two extruders, and their orientation, are fixed.

Another patent that discloses coextrusion of materials using a plurality of extruders to feed a single extrusion die is U.S. Pat. No. 4,643,659, which issued Feb. 17, 1987, to Helmut Paul. Three separate extruders are disclosed, one of which is mounted on an inclined frame and is movable along the inclined portion of the frame toward and away from an extrusion die to which the remaining two extruders are operatively connected.

In the course of operating extruders, it is at times necessary to remove the extruder screws, either to permit repair of the original screws, or to permit substitution of different screws. In the known coextrusion arrangements disclosed in the above-identified patents, removal of the screws from the non-horizontally positioned extruders is rendered difficult. In each instance, withdrawal of the screws from the inclined extruder must be accomplished either through the rear of the barrel, or in the case of the structure disclosed in the Paul '659 patent referred to above, the inclined extruder must be withdrawn from the die and moved upwardly along the inclined track to permit screw removal to be accomplished through the forward end of the barrel. In each instance, the disclosed arrangements do not permit convenient removal of the screws.

Additionally, even with the Paul '659 structure, which would permit removal through the forward end of the barrel of screws having constant screw diameters, if a twin screw extruder were to be provided having conically shaped screws, those whose outer diameter diminishes from the rear to the forward end of the screw, removal of such screws would have to be accomplished through the back end of the barrel which would be difficult and inconvenient.

Each of the above-identified patents also shows the inclined extruder to be positioned so that its axis defines an obtuse angle with the axis of an opposed, horizontally oriented extruder. Consequently, considerable additional floor space is required in order to accommodate such an arrangement of extruders, which severely limits the number of coextrusion arrangements that can be accommodated in the floor area of a given manufacturing facility.

It is an object of the present invention to overcome the problems and limitations that are inherent in the prior art structures as disclosed in the above-identified patents.

It is a further object of the present invention to provide an improved coextrusion system for more convenient removal of the screws from an upwardly extending extruder, and also for minimizing the floor area required for such a coextrusion system.

SUMMARY OF THE INVENTION

Briefly stated, in accordance with one aspect of the present invention, extrusion apparatus is provided for coextrusion of a plurality of separate materials through a single extrusion die. The apparatus includes a base having a first support for supporting a first rotary screw extruder and a second support carried by the base for supporting a second rotary screw extruder. Each of the extruders includes a tubular barrel and at least one plastication screw rotatably received within the barrel for rotation about a longitudinal axis. The first extruder is carried on the first support means for extrusion of plastics material with the longitudinal axis of the screw extending in a first, substantially horizontal direction.

The second extruder is positioned above the first extruder and is supported on the second support means, which includes a substantially horizontally extending pivot axis for pivotally carrying the second extruder for pivotal movement between a first position, in which the longitudinal axis of the second extruder is inclined at an acute angle relative to and in overlying relationship with the axis of the first extruder, and a second position in which the second extruder is substantially horizontal. Each of the first and second extruders is adapted to engage with a unitary die head for coextruding materials to form a coextruded shape.

An actuator is provided between the base and the second extruder for pivoting the second extruder about the pivot axis between a first position in which the second extruder is oriented to permit it to feed plasticated material to the extrusion die, and a second position in which the second extruder is pivoted so that its forward end is moved away from the axis of the first extruder, and away from the extrusion die, to permit convenient removal of the screw from the second extruder.

DESCRIPTION OF THE PREFERRED EMBODIMENTS

Figure 1:
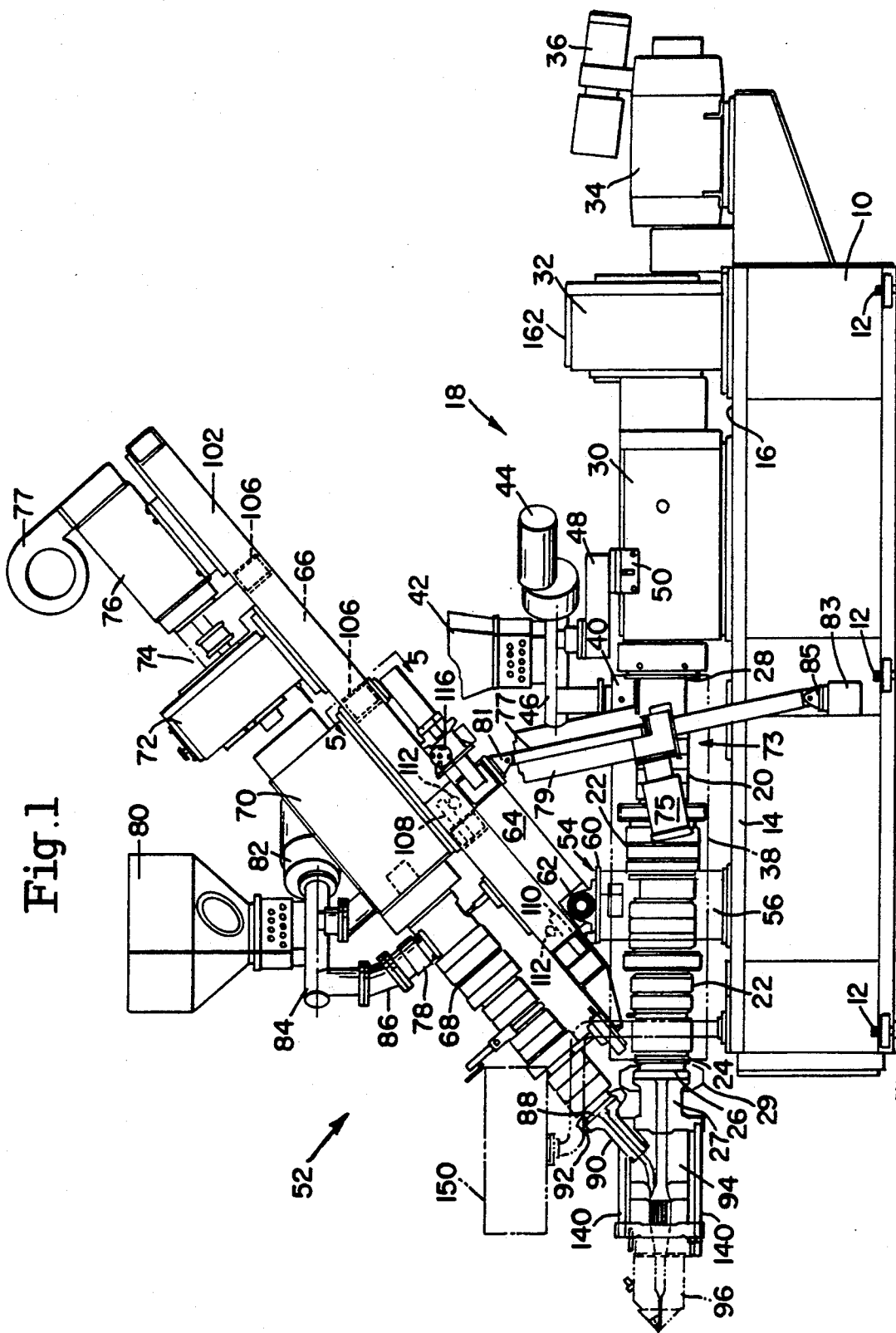
FIG. 1 is a side elevational view of extrusion apparatus in accordance with the present invention in which a second extruder is positioned above and in pivotal relationship relative to a first extruder and about a substantially horizontal axis.
Figure 2:
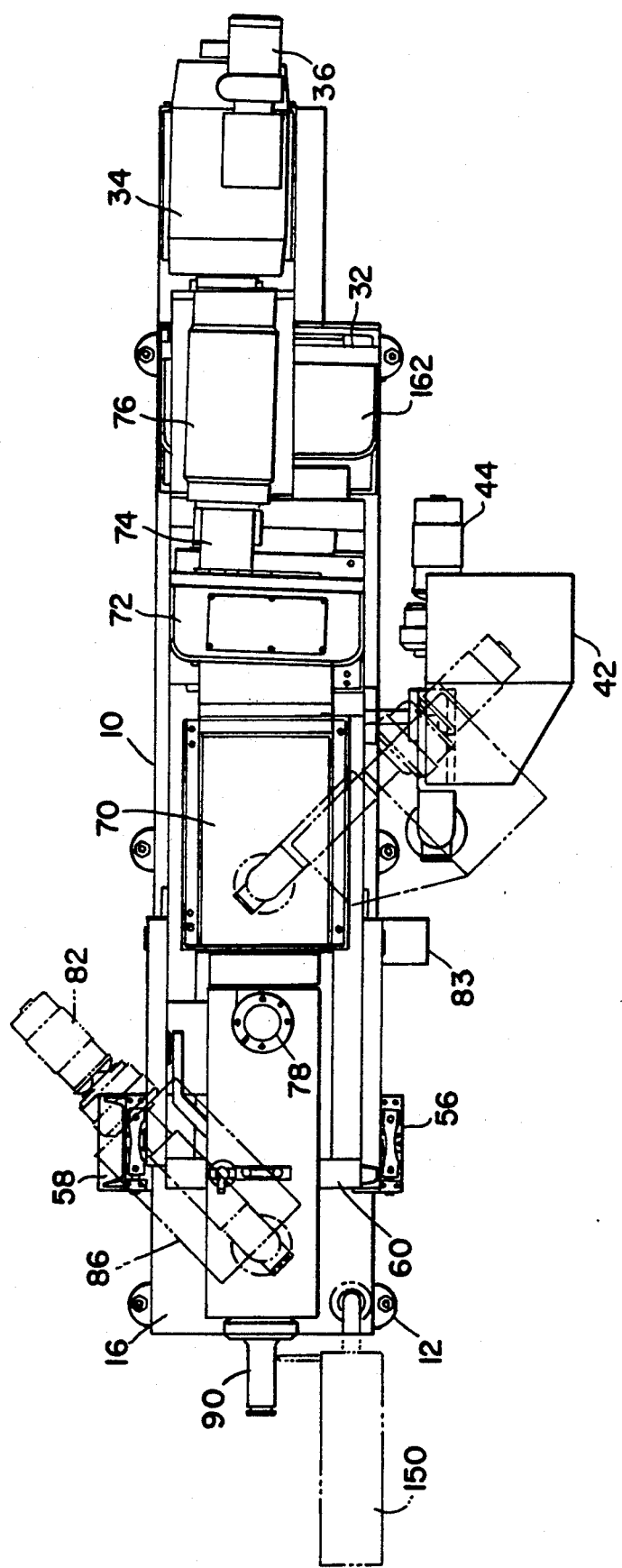
FIG. 2 is a top plan view of the extrusion apparatus shown in FIG. 1.

Referring now to the drawings, and particularly to FIGS. 1 and 2 thereof, there is shown a coextrusion arrangement including a first, lower extruder 18 and a second, upper extruder 52, each of which provides plasticated material to a common extrusion die 96. The arrangement permits the extrusion of a predetermined extruded shape from different materials, or from common base materials that each include different additives, such as color, for providing coextruded articles in a single extrusion operation.

First extruder 18 is positioned so that its longitudinal axis is disposed substantially horizontally, while second extruder 52 is positioned above first extruder 18 and has its longitudinal axis disposed at an angle to that of first extruder 18. As can be seen, the disclosed arrangement permits a coextrusion apparatus to be provided in a minimum of floor space.

The coextrusion arrangement is supported on a machine base 10 defined by a generally rectangular, box-type frame having an overall structure that is well-known to those having ordinary skill in the art. Base 10 includes a plurality of levelling screws 12 at the lowermost periphery, and includes a base plate 14 at its uppermost portion, base plate 14 preferably being oriented so that its upper surface 16 lies substantially in a horizontal plane.

THE FIRST EXTRUDER

Carried by and secured to uppermost surface 16 of base plate 14 is first extruder 18 that incorporates a tubular extruder barrel 20 that has its axis extending in a substantially horizontal direction. Barrel 20 includes an inner, rotatable plastication screw (not shown), and a plurality of outer, resistance-type heater bands 22 to apply heat to the exterior of barrel 20. Heater bands 22 aid in softening the plastic material while the material is mechanically worked by the plastication screw and as the material is being conveyed within barrel 20 in a direction toward the barrel outlet 24 by the plastication screw. Barrel 20 includes a forward flange 26 at outlet 24, and it also includes a drive end 28 that permits a drive coupling (not shown) to couple the plastication screw with a drive gear system enclosure 30 which, in turn, is coupled with a reduction gearbox 32 that receives power from a screw drive motor 34. A drive motor cooling blower 36 is carried by the motor casing of motor 34.

Barrel 20 includes an outer cover 38 that has a generally rectangular cross section and that has its inner surfaces spaced from the outer surface of barrel 20 and from the outer surfaces of heater bands 22. Adjacent drive end 28 of barrel 20 is a plastics material inlet 40 that receives pelletized or powdered plastic material that is placed in a feed hopper 42. The material is transported to material inlet 40 by means of a feed screw drive motor 44 that drives a feed screw (not shown) carried within a feed screw housing 46. Hopper 42 and feed screw housing 46 are partially supported from drive gear system enclosure 30 by a feeder support member 48 that is carried by a support bracket 50 secured to enclosure 30.

THE SECOND EXTRUDER

Second extruder 52 is also supported by machine base 10 and is carried on a pedestal 54 that extends upwardly from base plate 14. Pedestal 54 includes a pair of pedestal uprights 56, 58 (see FIGS. 2 and 4) spaced from and positioned on opposite sides of barrel 20 of first extruder 18. Uprights 56 and 58 extend upwardly a distance beyond first extruder barrel cover 38, and they each support a pedestal crossplate 60 that supports a pivot shaft 62, the support structure of which will be described hereinafter. Pivot shaft 62 pivotally carries a support cradle 64 that, in turn, carries an upper extruder support frame 66, which, as shown in FIG. 5, is a generally rectangular structure formed from a plurality of box-type beams of known construction.

Support frame 66 carries second extruder 52 and its related drive system. Included on support frame 66 are an extruder barrel 68, a rotatable extruder screw (not shown) positioned within the barrel, a screw drive coupling (not shown), a gearing system enclosure 70, a gearbox 72, a drive motor coupling 74, and a drive motor 76 along with a drive motor cooling blower 77. Second extruder 52 and related components carried by support frame 66 are similar in structure and function to the corresponding parts forming a part of first extruder 18. Consequently, second extruder 52 includes a material inlet 78 that is in communication with a plastic material feed hopper 80 for receiving pelletized or powdered plastics material. A material feed screw drive motor 82 rotates a feed screw (not shown) carried within a feed screw housing 84 to carry the plastics material from feed hopper 80 to material inlet 78. As shown, because of the angular orientation of second extruder 52, relative to first extruder 18, a feed conduit adapter 86 is provided to permit feed screw housing 84 to be oriented so that its longitudinal axis is substantially in a horizontal plane.

Second extruder 52 includes a barrel outlet 88 that includes a flange for connection of outlet 88 with a die entry adapter 90 by means of a split ring clamp 92. First extruder 18 includes a die entry adapter 27 that is also connected with first extruder outlet 26, by means of a split clamp 29. Each of die entry adapters 27 and 90 is so configured that it can be easily connected with a coextrusion block 94 so that plasticated material can be conveyed from the respective first and second extruders to the die 96, to thereby form a coextruded article of predetermined shape.

THE SECOND EXTRUDER PIVOT STRUCTURE

Figure 3:
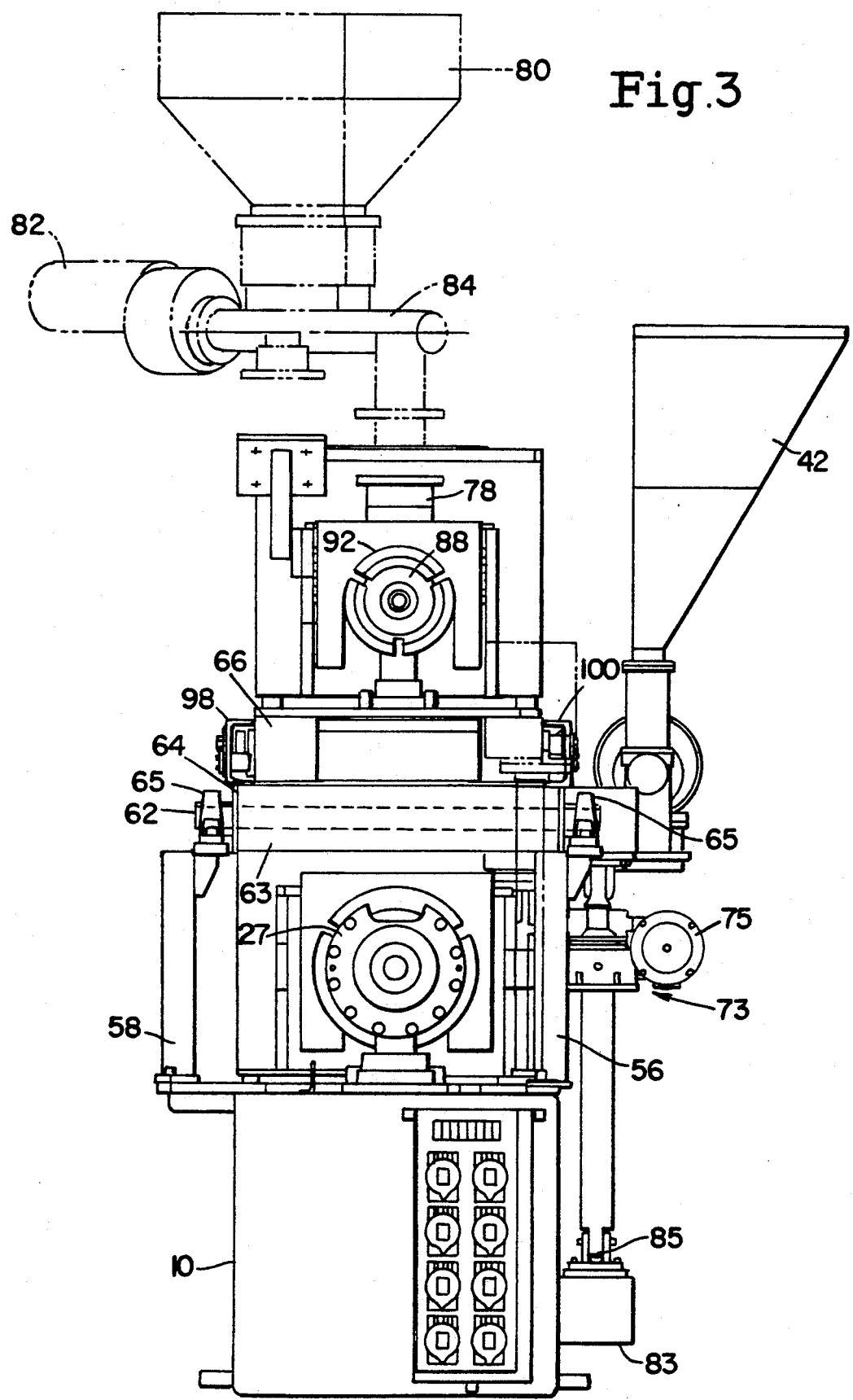
FIG. 3 is a left end view of the extrusion apparatus shown in FIG. 1 with the second, upper extruder pivoted so that its axis is substantially parallel with the first, or lower extruder.
Figure 4:
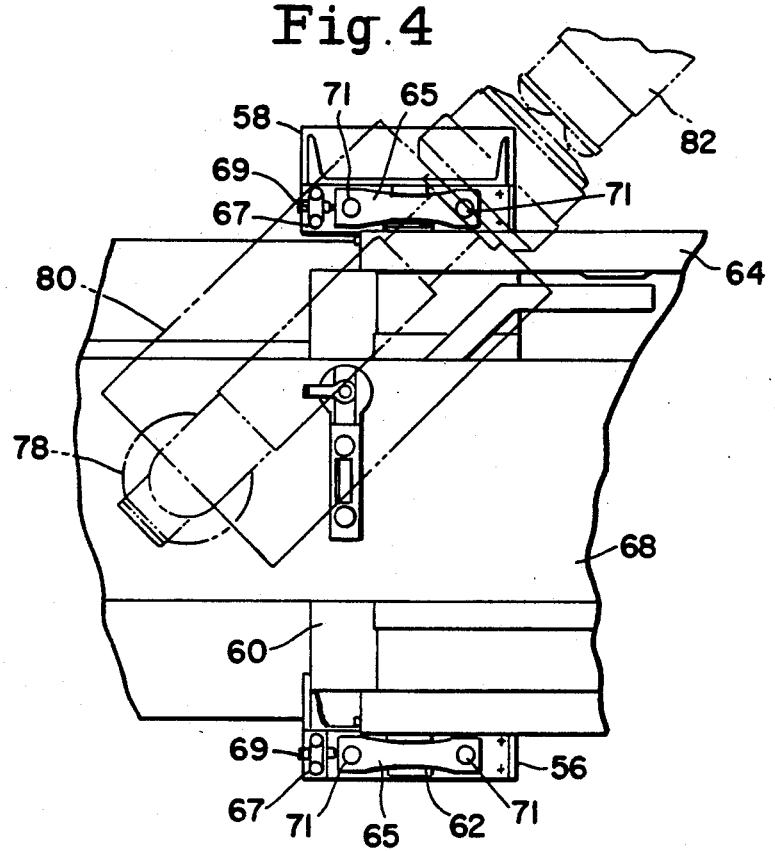
FIG. 4 is a fragmentary, enlarged top plan view of the apparatus of FIG. 1 showing the pivot axis supporting structure.
Figure 5:
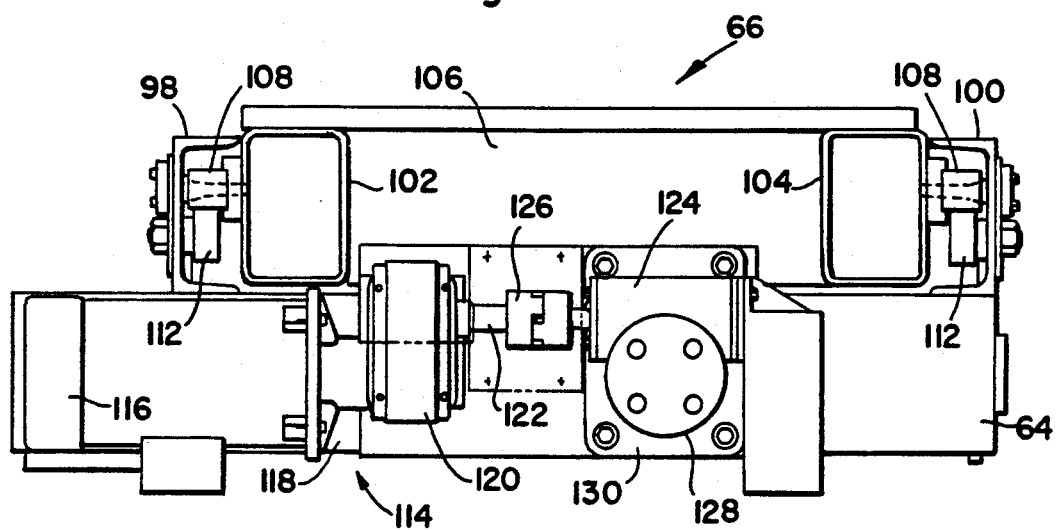
FIG. 5 is an end view, partially in section, showing the support carriage structure for supporting the upper extruder for movement in the direction of the extruder barrel axis and taken along the line 5—5 of FIG. 1.

Referring now to FIGS. 3 and 4, pivot shaft 62 is carried within and secured to a pivot sleeve 63 that, in turn, is secured to the second extruder support cradle 64. Cradle 64 is a generally rectangular structure of box-beam-type construction, and pivot sleeve 63 is secured to the forward end thereof. Pivot shaft 62 is rotatably carried on a pair of spaced pillow blocks 65, each of which is carried on a respective pedestal upright 56, 58 that extends upwardly from the lower extruder base plate 16. Pillow blocks 65 overlie and are connected to the pivot pedestal crossplate 60, which also carries a pair of respective pillow block adjusting blocks 67 to enable individual fore-and-aft adjustment of the respective pillow blocks to properly orient the ends of pivot shaft 62.

As best seen in FIG. 4, adjusting blocks 67 each carry respective pillow block adjusting screws 69, that extend through blocks 67 and into contact with a respective pillow block 65 which, by virtue of having elongated apertures through which pillow block connecting bolts 71 extend, can be shifted from right to left, as viewed in FIG. 4, whereupon connecting bolts 71 are tightened to securely position pivot shaft 64.

Referring once again to FIG. 1, second extruder 52 is pivotally movable about pivot shaft 64 by means of an electrically powered jackscrew assembly 73, which extends between machine base 10 and second extruder support cradle 64. Jackscrew assembly 73 includes an electric drive motor 75 that drives elevating screw 77 through a worm and worm gear arrangement (not shown), which causes elevating screw 77 to be moved into and out of a jackscrew housing 79. Housing 79 is connected to support cradle 64 by an upper pivot and clevis arrangement 81, and the outer, free end of elevating screw 77 is connected at a jackscrew support beam 83, which extends laterally outwardly from machine base 10, by means of a lower pivot and clevis arrangement 85.

THE SECOND EXTRUDER SUPPORT FRAME STRUCTURE

As best seen in FIGS. 1 and 5, support cradle 64 includes a pair of spaced, parallel, U-shaped guide channels 98, 100 that are positioned on opposite sides of and have their respective opening sides in facing relationship to each other and to the opposite sides of upper extruder support frame 66. As shown, support frame 66 includes a pair of parallel, longitudinally extending box beams 102, 104 with a plurality of intermediate crossmembers 106. Each of box beams 102, 104 includes on its outwardly facing side surface a pair of longitudinally extending, offset, parallel elongated track members 108, 110. Respective guide channels 98, 100 of support cradle 64 each carry a plurality of interiorly positioned, longitudinally aligned, rotatable rollers 112 that are adapted to engage an upwardly or a downwardly facing surface of the respective track members 108, 110, to permit upper extruder support frame 66 to be slidably shifted along and relative to guide channels 98 and 100 of support cradle 64 in order to position second extruder 52 so that extruder 88 outlet can be properly axially aligned and connected with coextrusion block 94.

Movement of support frame 66 relative to support cradle 64 is accomplished by means of an electric jackscrew assembly 114 that includes a jackscrew drive motor 116 carried on a support bracket 118 connected with support cradle 64, and a speed reducer 120 operatively connected with the drive motor and having an output shaft 122 connectable with a jackscrew worm (not shown) contained within a jackscrew worm housing 124 and connected with speed reducer 120 through a drive coupling 126. The jackscrew housing 128 is supported by a jackscrew bracket 130 that is connected with support cradle 64. The jackscrew (not shown) extends from jackscrew housing 128 and is engageable with a corresponding nut (not shown) that is carried by upper extruder support frame 66 to permit powered movement of support frame 66, and of second extruder 52, in a linear manner relative to support cradle 64.

THE COEXTRUSION DIE CONNECTION

Figure 6:
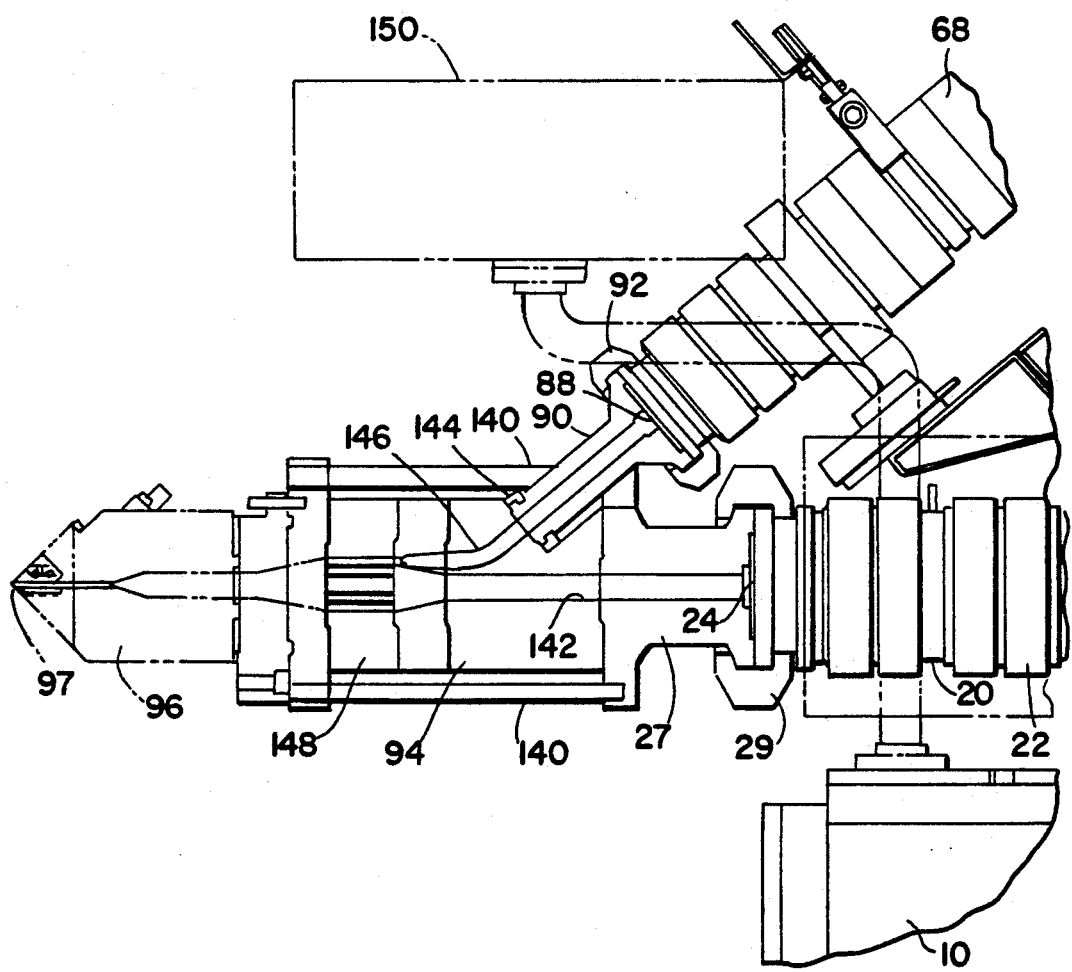
FIG. 6 is an enlarged, fragmentary side view, partially in section, of one form of extrusion die showing the interconnections therewith of the respective first and second extruders shown in FIG. 1.

Referring now to FIG. 6, the respective die entry adapters 27, 90 for the respective first and second extruders are connected to the respective extruder outlets 24, 88 by means of respective split clamp rings 29, 92. First extruder die entry adapter 27 is connected with coextrusion block 94 by a plurality of bolts 140 so that the flow passage in die entry adapter 27 is interconnected with first flow passage 142 in coextrusion block 94. Second extruder die entry adapter 90 is connected with a split flange arrangement 144 to securely interconnect the flow passage in die entry adapter 90 with second flow inlet passage 146 in coextrusion block 94. The softened plastics materials flow from the respective extruders into coextrusion block 94 and through a flow straightening plate 148, which straightens the flow and equalizes the flow velocities of the respective streams of plastics material. The material then flows into die 96 and issues from die outlet 97. Although a die for forming a sheet of material is illustrated in FIG. 6, it will be apparent that other types of die housings for forming other extruded shapes can also be provided, if desired.

OPERATION OF THE APPARATUS

Each of extruders 18 and 52 is operated in the normal manner, and that operation can be accomplished through a single operator control panel 150 containing the necessary switches, indicators, and controls. Simultaneous flows of plastics materials from each of the extruders enter the die and issue as a single extruded cross section. For example, an extruded section that can be used for siding for homes can be extruded using a base material, or substrate, of polyvinyl chloride resin that flows from extruder 18. A cap stock or cover material can be arranged to flow from second extruder 52 to form a thin cover layer over the base material. The color, ultraviolet absorbers, and other expensive additives can be confined to the cover material, to thereby reduce the quantity of such additives that is needed, and thereby reduce the cost of the finished extruded product.

When removal of the screws from the upper extruder is desired, split flange 144 at the downstream end of die entry adapter 90 is disconnected, and support frame jackscrew motor 116 is actuated to withdraw die entry adapter 90 sufficiently from coextrusion block 94 to avoid interference when the extruder structure is pivoted about pivot shaft 62.

Lowering of upper extruder 52 is accomplished by actuating an elevating jackscrew motor 160 to cause support cradle 64 and support frame 66 to pivot about pivot shaft 62 in a clockwise direction, as viewed in FIG. 1, until support frame 66 is in contact with the bearing surface 162 on the top of lower extruder gearbox 32.

With the second extruder longitudinal axis disposed in a generally horizontal orientation, the second extruder drive connection can be disassembled, the second extruder barrel pivoted about a vertical axis (not shown) to permit the screw or screws to be readily removed from the barrel. In that regard, the present invention is especially useful where the second or upper extruder is a twin screw extruder having conical, tapered plasticating screws, which can only be removed from the rear of the barrel. After replacement of the screws, the described steps are reversed to once again orient the second extruder in a desired operating position.

The respective jackscrews can also be operated to properly orient die entry adapter 90 to conform with the position and orientation of a corresponding flow channel of a different coextrusion block for use with a different die.

The jackscrews that are used both to pivot the upper extruder support frame, and also to translate it toward and away from the die housing, can be an electrically operated machine screw jacks of the type manufactured by Duff-Norton Co., of Charlotte, N.C., or by Nook Industries, Inc., of Cleveland, Ohio. Although electrically operated machine screw jacks are preferred, other actuating arrangements can also be provided, if desired, such as manually operated jackscrews, hydraulic actuators, or the like.

It will be apparent that the present invention provides distinct advantages over the prior art structures, in that it provides a coextrusion arrangement which occupies considerably less floor space than do the prior art devices. Additionally, the pivotal mounting of the upper or second extruder greatly facilitates removal of the plasticating screws from the upper extruder, and the combined elevating and translating jackscrew arrangements disclosed permit convenient and accurate orientation of the upper extruder relative to the lower extruder in order to accommodate different die configurations.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. Extrusion apparatus for coextruding separate and distinct streams of plasticated material that are separately introduced into a unitary extrusion die to provide a coextruded product, said apparatus comprising:
   a. a base including a first support for supporting a first rotary screw extruder and a second support for supporting a second rotary screw extruder;
   b. a first rotary screw extruder having a first tubular barrel and a first plastication screw rotatably received within the first barrel, the first extruder carried on the first support means for extrusion of plastic material with the first screw having a longitudinal axis extending in a first direction;
   c. a second rotary screw extruder having a longitudinal axis and having a second tubular barrel and at least one second plastication screw rotatably received within the second barrel, the second extruder positioned above the first extruder and pivotally carried on the base for pivotal movement about a substantially horizontal pivot axis, the second extruder being pivotable between a first position in which the second extruder has its longitudinal axis inclined at an acute angle relative to the axis of the first screw, and a second position in which the second extruder has its longitudinal axis oriented substantially parallel with the longitudinal axis of the first screw, the first and second extruders adapted to engage with the unitary die for coextruding an article;
   d. a first actuator extending between the base and the second extruder for pivotal movement of the second extruder about the pivot axis; and
   e. a second actuator extending between the second support and the second extruder for linear movement of the second extruder along its longitudinal axis toward and away from a coextrusion die.

2. An extrusion apparatus in accordance with claim 1 wherein the at least one second extruder screw includes a pair of interengaging, counter-rotating extrusion screws.

3. Extrusion apparatus in accordance with claim 2 wherein the extrusion screws of the second extruder are of conical form and have a smaller diameter at an extruder barrel outlet.

4. Extrusion apparatus in accordance with claim 1 wherein the first actuator includes a power operated jackscrew.

5. Extrusion apparatus in accordance with claim 1 wherein the second support includes a support frame for supporting the second extruder, and wherein the support frame is mounted on the base for pivotal movement about the pivot axis.

6. Extrusion apparatus in accordance with claim 5 wherein the support is slidable along the second support to carry the second extruder barrel and the at least one second plastication screw together for sliding movement along a slide path to permit axial movement of the second extruder toward and away from the longitudinal axis of the first extruder.

7. Extrusion apparatus in accordance with claim 6 wherein the second support includes a track and roller for movably supporting the second extruder.

8. Extrusion apparatus in accordance with claim 6 wherein the support frame includes a power operated actuator for moving the second extruder along the support frame.

9. Extrusion apparatus in accordance with claim 1 wherein the base includes a third support spaced from the second support for supporting the second extruder in a substantially horizontal position.

10. Extrusion apparatus in accordance with claim 1, wherein the horizontal pivot axis is positioned above the first extruder.

11. Extrusion apparatus in accordance with claim 1, wherein the second support includes a frame that is pivotally carried on the base, and a carriage that is movable linearly along the frame, and wherein the second extruder is mounted on the carriage for movement in a direction toward and away from the coextrusion die.

* * * * *